United States Patent
Dardona (10) Patent No.: US 10,794,220 B2
(45) Date of Patent: Oct. 6, 2020

(54) TEMPERATURE SENSOR ARRAY FOR A GAS TURBINE ENGINE

(71) Applicant: United Technologies Corporation, Farmington, CT (US)

(72) Inventor: Sameh Dardona, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 496 days.

(21) Appl. No.: 15/588,828

(22) Filed: May 8, 2017

(65) Prior Publication Data

US 2018/0320545 A1 Nov. 8, 2018

(51) Int. Cl.

| G01K 7/16 | (2006.01) |
|---|---|
| F01D 21/00 | (2006.01) |
| F02C 3/04 | (2006.01) |
| F23R 3/00 | (2006.01) |
| F01D 21/12 | (2006.01) |

(52) U.S. Cl.
CPC ........... *F01D 21/003* (2013.01); *F01D 21/12* (2013.01); *F02C 3/04* (2013.01); *F23R 3/002* (2013.01); *G01K 7/16* (2013.01); *F05D 2220/32* (2013.01); *F05D 2240/35* (2013.01); *F05D 2270/112* (2013.01); *F05D 2270/303* (2013.01); *F05D 2270/80* (2013.01)

(58) Field of Classification Search
CPC ........... G01K 7/16; G01K 1/14; G01K 13/02; G01K 13/00; G01K 2217/00; G01K 7/00; G01K 2213/00; G01K 2205/00; G01N 2291/02881

See application file for complete search history.

(56) References Cited

U.S. PATENT DOCUMENTS

| 4,548,516 A * | 10/1985 | Helenowski ........... A61B 5/028 374/135 |
|---|---|---|
| H562 H * | 12/1988 | Trachier et al. ............. 364/557 |
| 6,077,228 A * | 6/2000 | Schonberger .......... A61B 5/015 374/100 |
| 6,180,867 B1 * | 1/2001 | Hedengren .............. G01K 3/14 136/201 |
| 7,038,996 B2 * | 5/2006 | Binnig ..................... G01D 5/16 369/101 |

(Continued)

FOREIGN PATENT DOCUMENTS

| EP | 2801704 | 11/2014 |
|---|---|---|
| FR | 3003544 | 9/2014 |
| WO | WO2015017035 A * | 2/2015 |

OTHER PUBLICATIONS

European Search Report for Application No. 18171354.6 dated Oct. 24, 2018.

*Primary Examiner* — Gail Kaplan Verbitsky
(74) *Attorney, Agent, or Firm* — Carlson, Gaskey & Olds, P.C.

(57) ABSTRACT

A gas turbine engine component includes a conformal surface. An array of resistance temperature detector (RTD) sensors is disposed across at least a portion of the conformal surface and a plurality of printed circuit traces are deposited on the conformal surface. The printed circuit traces connect each of the RTD sensors to a controller via a corresponding four wire circuit. Each circuit trace in the plurality of circuit traces extends to a circumferential edge of the conformal surface.

18 Claims, 5 Drawing Sheets

(56) References Cited

U.S. PATENT DOCUMENTS

| | | | |
|---|---|---|---|
| 7,116,261 B1 * | 10/2006 | Li | H03M 1/1028 341/155 |
| 7,709,766 B2 | 5/2010 | Gambino et al. | |
| 8,444,377 B2 | 5/2013 | Kottilingam et al. | |
| 8,547,005 B1 * | 10/2013 | Smith | H01J 1/22 313/341 |
| 8,662,746 B2 * | 3/2014 | Subramanian | F01D 17/085 374/141 |
| 9,297,707 B2 * | 3/2016 | Bellis | G01K 1/026 |
| 9,933,313 B2 * | 4/2018 | Agrawal | G01M 15/14 |
| 9,945,737 B2 * | 4/2018 | DeSilva | G01K 1/20 |
| 10,234,338 B2 * | 3/2019 | Rieder | G01K 7/427 |
| 2007/0028912 A1 * | 2/2007 | Gagas | A47J 37/0704 126/9 R |
| 2007/0122070 A1 * | 5/2007 | Singh | F01D 17/02 384/448 |
| 2008/0003353 A1 | 1/2008 | Hardwicke et al. | |
| 2012/0248092 A1 * | 10/2012 | Uhland | H01C 7/02 219/546 |
| 2013/0004811 A1 * | 1/2013 | Banerjee | G01K 7/16 429/62 |
| 2013/0209846 A1 * | 8/2013 | Lev | H01M 10/48 429/90 |
| 2015/0023393 A1 * | 1/2015 | Britton | G01K 7/24 374/185 |
| 2015/0127288 A1 * | 5/2015 | Coursey | G01K 7/20 702/99 |
| 2015/0297292 A1 * | 10/2015 | Sutermeister | A61B 18/082 606/41 |
| 2016/0209259 A1 * | 7/2016 | Edwards | G01F 23/0007 |
| 2017/0064415 A1 | 3/2017 | Berkcan et al. | |
| 2018/0087973 A1 * | 3/2018 | Shi | G01K 7/028 |
| 2019/0078942 A1 * | 3/2019 | Uozumi | G01K 7/22 |

* cited by examiner

TEMPERATURE SENSOR ARRAY FOR A GAS TURBINE ENGINE

TECHNICAL FIELD

The present disclosure relates generally to gas turbine engine temperature sensors, and more specifically to a temperature sensor array for utilization in the same.

BACKGROUND

Gas turbine engines, such as those utilized in commercial and military aircraft, typically include a compressor section that ingests and compresses air, a combustor section that mixes the compressed air with a fuel and ignites the mixture, and a turbine section across which the resultant combustion gasses are expanded. The expansion of the resultant combustion gasses drives the turbine to rotate, which drives rotation of a shaft.

As a result of the combustion, extreme temperatures are generated within the gas turbine engine. In some cases, the temperature within the gas turbine engine can exceed the operating temperature thresholds of turbine engine component materials. In order to prevent, or minimize, damage to the turbine engine components, cooling systems are included at the components susceptible to excessive thermal strains.

SUMMARY OF THE INVENTION

In one exemplary embodiment a gas turbine engine component includes a conformal surface, an array of resistance temperature detector (RTD) sensors disposed across at least a portion of the conformal surface, a plurality of printed circuit traces deposited on the conformal surface and connecting each of the RTD sensors to a controller via a corresponding four wire circuit, and wherein each circuit trace in the plurality of circuit traces extends to a circumferential edge of the conformal surface.

In another example of the above described gas turbine engine component the RTD sensors and the printed circuit traces are direct print components.

In another example of any of the above described gas turbine engine components each of the printed circuit traces is comprised of at least one of a copper, nickel, silver, platinum, and tungsten material.

In another example of any of the above described gas turbine engine components each of the RTD sensors is comprised of one of a pure platinum material and a printable ink formulation of platinum and an additive, wherein the additive is one of a ceramic additive and a polymeric additive.

In another example of any of the above described gas turbine engine components a line resistance of each of the circuit traces is negligible relative to a resistance value of a connected RTD sensor at a minimum operating temperature.

In another example of any of the above described gas turbine engine components a first node of each RTD sensor is connected to a current source and a first input of a programmable gain amplifier, and a second node of each RTD sensor is connected to a neutral and a second input of the programmable gain amplifier.

In another example of any of the above described gas turbine engine components each of the RTD sensors is connected to the same programmable gain amplifier via a multiplexer.

Another example of any of the above described gas turbine engine components further includes a plurality of programmable gain amplifiers, and wherein each of the RTD sensors is connected to a distinct programmable gain amplifier.

In another example of any of the above described gas turbine engine components an output of each of the programmable gain amplifiers is provided to a microcontroller.

Another example of any of the above described gas turbine engine components further includes a wetting layer disposed between the printed circuit traces and the conformal surface.

In another example of any of the above described gas turbine engine components the wetting layer comprises a crystalline molybdenum compound.

In another example of any of the above described gas turbine engine components the crystalline molybdenum compound comprises Mo2C.

In another example of any of the above described gas turbine engine components the conformal surface is a surface of a combustor panel.

In another example of any of the above described gas turbine engine components of the RTD sensors is a printed precision RTD sensor comprising a primary trace and a plurality of secondary traces, a subset of the plurality of secondary traces being shorted by a conductive layer.

In another example of any of the above described gas turbine engine components the primary trace is comprised of one of a platinum and a platinum and ceramic mixture, and wherein the secondary traces are comprised of the same material as the primary trace.

In another example of any of the above described gas turbine engine components the conductive layer is comprised of a silver material.

In another example of any of the above described gas turbine engine components each of the conductive layers is a terminal pad for one node of the corresponding four wire circuit.

In one exemplary embodiment a gas turbine engine includes a compressor, a combustor fluidly connected to the compressor, a turbine fluidly connected to the combustor, and at least one component including a thermal sensor array disposed about at least one conformal surface of the gas turbine engine, wherein the thermal sensor array is an approximately two dimensional array.

In another example of the above described gas turbine engine each thermal sensor in the thermal sensor array is a resistance temperature detector (RTD) sensor and wherein each of the RTD sensors is connected to a current source and a first input of a programmable gain amplifier, and a second node of each RTD sensor is connected to a neutral and a second input of the programmable gain amplifier.

In another example of any of the above described gas turbine engines the at least one conformal includes a conformal surface of one of the compressor, the combustor, and the turbine.

An exemplary method for monitoring a component temperature of a gas turbine engine component during operation of the gas turbine engine includes providing a resistance measurement from a plurality of direct print resistance thermal detector (RTD) sensors to a controller via a four wire circuit connection, wherein each of the RTD sensors is part of an approximately two dimensional sensor array.

These and other features of the present invention can be best understood from the following specification and drawings, the following of which is a brief description.

DETAILED DESCRIPTION OF AN EMBODIMENT

Figure 1:
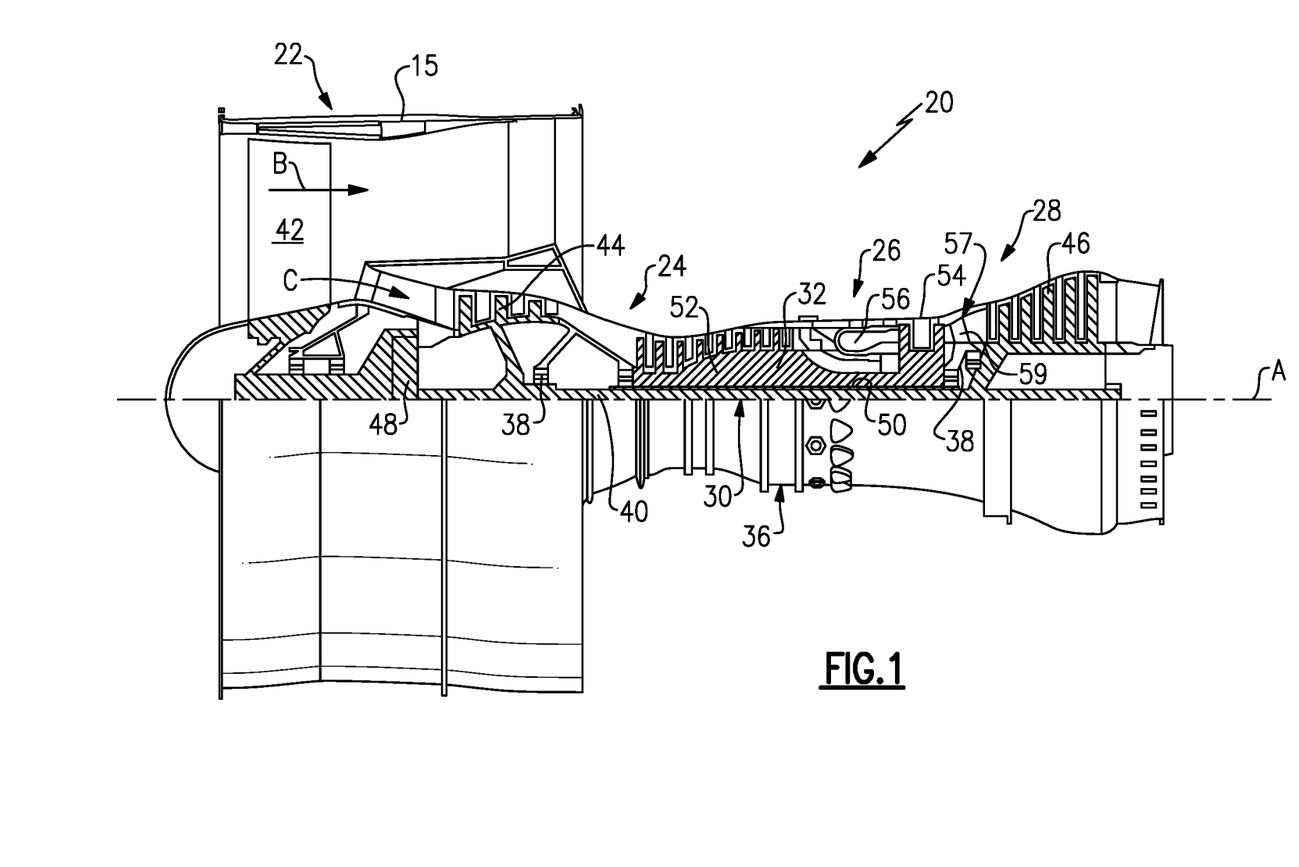
FIG. 1 schematically illustrates an exemplary gas turbine engine.

FIG. 1 schematically illustrates an exemplary gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to any other type of turbine engines including three-spool architectures, direct drive architectures, and the like.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Accurate and reliable measurement of temperatures within the gas turbine engine 20 is critical for validation of the materials, tools, structures and methodologies used in the design and construction of gas turbine engines, such as the exemplary gas turbine engine 20. Further, accurate engine temperature monitoring during engine operations can aide in ensuring that the engine is maintained within validated temperature limits and thereby ensure optimum flight operations.

In order to achieve the validation, some exemplary engine components, such as blade outer air seal components, have been constructed relying on a single point measurement of temperatures using conventional thermal sensors attached to the component being validated. The single point measurement assumes an even distribution of heat across the component being measured, and, as a result, cannot account for thermal gradients across the single component. Further, the thermal sensors used to monitor the temperature add additional thermal masses, potentially obstruct cooling flows, and can interfere with standard operations making validation more expensive and more difficult.

In order to ensure sufficient cooling during standard engine operation, the single point thermal sensors used in validation are omitted in the construction of the commercial engine. As a result, the actual running temperature of the component is not monitored during engine operations.

Figure 2:
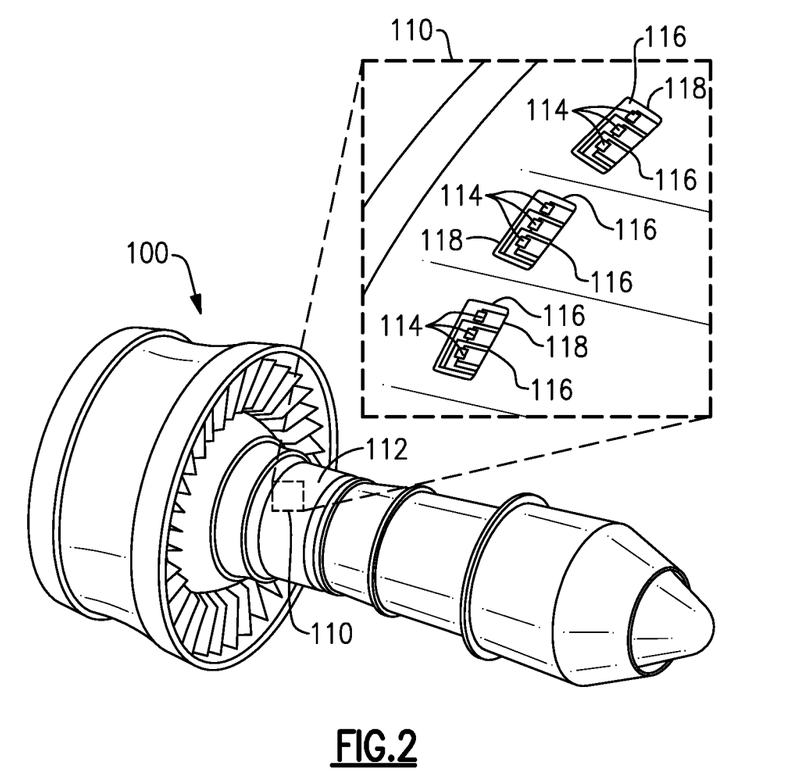
FIG. 2 schematically illustrates a gas turbine engine core including a temperature sensor array.

In order to allow for validation, and for continued engine monitoring during standard operations, an array of thermal sensors is included on one or more surfaces of the component to be monitored. With continued reference to FIG. 1, FIG. 2 schematically illustrates an exemplary gas turbine engine 100, omitting an outer housing, including a thermal sensor array 110 disposed partially across a surface 112 of the gas turbine engine 100. The thermal sensor array 110 includes multiple resistance temperature detector (RTD) sensors 114, disposed on a corresponding conformal surface 116. By way of example, the conformal surface 116 can be an insulating high temperature glass.

Each RTD sensor 114 in the array is connected to multiple printed circuit traces 117. The printed circuit traces 117 connect the RTD sensors 114 to a controller within the engine 100 via an electrical connection at a circumferential edge 118 of the conformal surface 116. As used herein, the circumferential edge 118 is an edge that circumscribes the conformal surface 116.

Figure 3A:
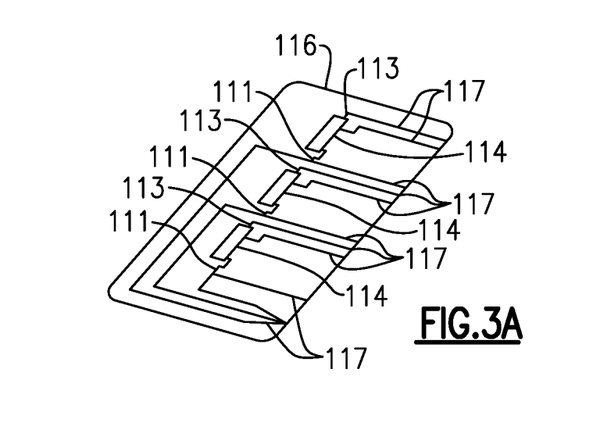
FIG. 3A schematically illustrates a first conformal surface on a gas turbine engine component.

With continued reference to the example of FIG. 2, FIG. 3A schematically illustrates a first exemplary conformal surface 116 isolated from the detail of FIG. 2. Each of the RTD sensors 114 is connected to four printed circuit traces 117 via a first node 111 and a second node 113. The four printed circuit traces 117 corresponding to each RTD sensor 114 are referred to as a four wire circuit, the details of which are explained below with regards to FIG. 5.

Figure 3B:
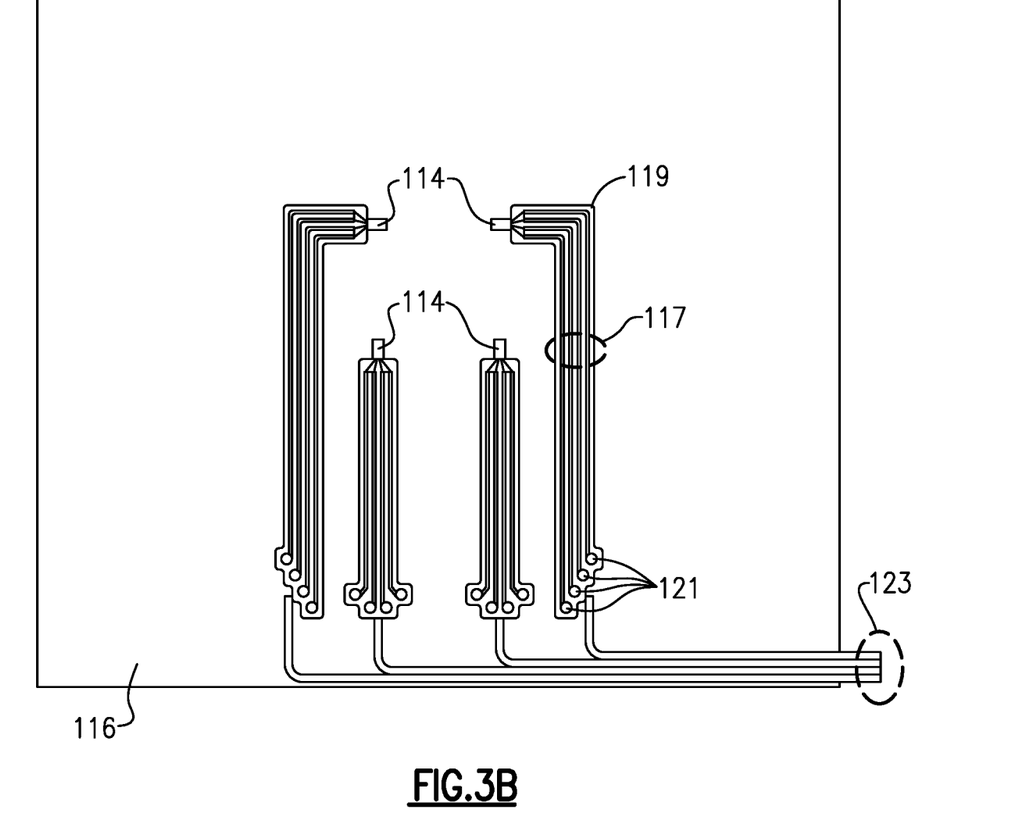
FIG. 3B schematically illustrates a second conformal surface on a gas turbine engine component.

Similarly, FIG. 3B schematically illustrates a second exemplary conformal surface 116 including four RTD sensors 114. Each of the RTD sensors is connected to circuit traces 117, as in the example of FIG. 3A. In the example of FIG. 4B, the conformal surface 116 is a metal surface, and a non-conductive layer 119 is printed between the circuit traces 117 is printed between the traces and the conformal surface 116 in order to prevent undesirable short circuits. In some examples, the non-conductive layer 119 can be a ceramic, or partially ceramic layer. While illustrated in the example of FIG. 3B as being a single non-conductive layer on which all four traces 117 for a given RTD sensor 114 are printed, one of skill in the art will appreciate that each trace 117 can be printed on a distinct layer and achieve the same result. In examples where the conformal surface 116 is a non-conductive surface, the non-conductive layer 119 can be omitted entirely. The circuit traces 117 lead away from the corresponding RTD sensor and have a set of terminals 121 at a circumferential edge of the conformal surface 116. A wiring harness 123 is connected to each set of terminals 121 at the circumferential edge and provides the RTD sensor 114 readings to a controller via any standard communication protocol. The wiring harness 123 can be connected via a weld, a conductive adhesive, or via any similar connection technique.

Figure 4:
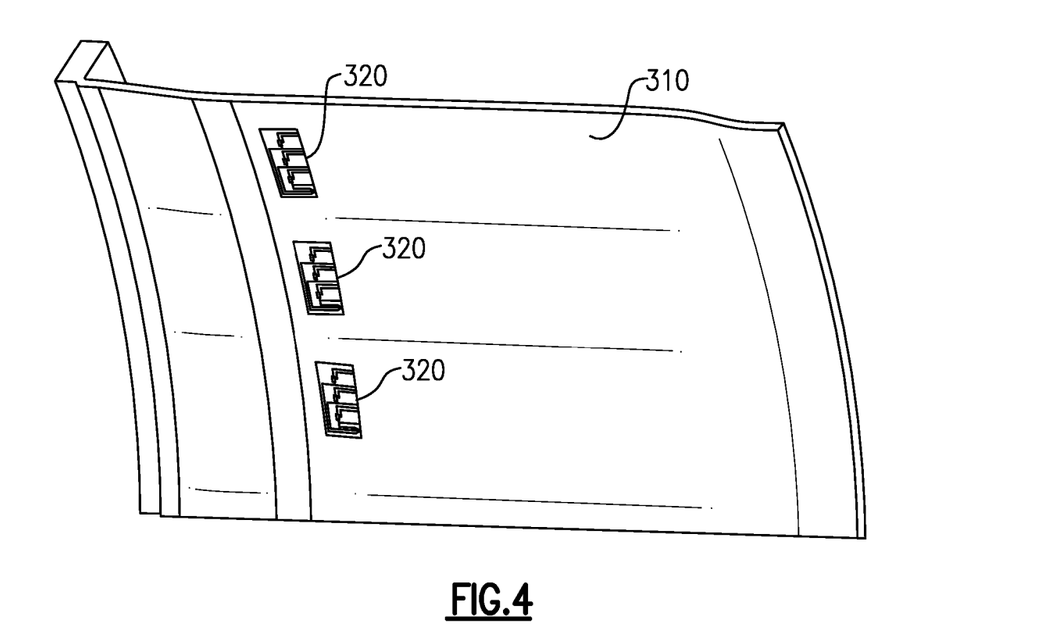
FIG. 4 schematically illustrates an alternate placement of conformal surfaces on an interior wall of a compressor.

With further reference to FIGS. 2 and 3, FIG. 4 illustrates an alternate example utilization of the printed thermal sensor arrays 110 of FIGS. 2 and 3. In some examples, it is desirable to monitor and/or validate the internal temperature of a compressor panel, such as the illustrated compressor panel 310. By distributing an array of thermal sensor configurations 320 across a zone of the panel 310, a temperature reading can be determined across the entire panel 310, and is not limited to a single point. Further, as both the RTD sensors and the printed circuit traces are printed components, the sensor configurations 320 protrude minimally into the compressor, or other engine component and do not interfere with or obstruct cooling. This validation and monitoring configuration can also be applied to other engine components including, but not limited to, blade outer air seals, rotor platforms, combustor panels, and the like.

With continued reference to each of FIGS. 1-4, the RTD sensor arrays are approximately two dimensional temperature sensor arrays, and are constructed at least partially using direct write processes. As used herein, approximately two dimensional refers to the sensor arrays, and corresponding wiring, having a negligible thickness protruding away from the conformal surface on which the sensors and traces are printed, such that there is no meaningful impact on the corresponding cooling system as a result of the presence of the sensors.

Direct write processes, as used herein, are a grouping of manufacturing technologies that create two dimensional or three dimensional meso, micro, and nano-scale functional structures using a freeform deposition tool without the need for tooling or masking of the surface being written on. Examples of direct write methods include aerosol jet (AJ), n-script extrusion, micro-cold spray deposition, and screen printing. One of skill in the art will understand that the listed direct print methods are exemplary only, and are not limiting. In some examples both the sensors 114 and the circuit traces 117 are constructed utilizing a direct write method.

In alternative examples, only the circuit traces 117 are constructed using a direct write method. In one such example, the RTD's are fabricated on top of a thin ceramic substrate using a vapor deposition of platinum. The RTD's are then cemented into the engine surface that is being measured. To generate the printed circuit traces, in examples where the engine surface is metal, a layer of a thin ceramic, such as alumina, zirconia, ythrium, silicate, silicon nitride, or the like, is printed on the portion of the RTD that will contact the metal surface. The layer of thin ceramic provides electrical isolation between the printed circuit trace and the metal surface.

The printed circuit traces are conductive metal leads, and are printed on the ceramic traces and laser welded and/or glued into the RTDs. In this way, the RTDs are manufactured separately on a thin ceramic substrate and integrated into the engine surface which contains ceramic insulation and metallic traces that are printed directly on the engine surface. The welding junction and the conductive metal traces can further be encapsulated using any known process to prevent oxidation and degradation.

Each of the sensors used in the array is constructed with an equal value, and their resistance will change as the temperature changes at the same rate. The sensors are produced using a direct write extrude that creates round, or wire, shaped portions that have an identical resistance for per unit length. The circuit traces are constructed using a high conductivity copper, or other highly conductive direct print metal material, and connect the sensors to an edge of the conformal surface. At the edge of the conformal surface, the sensors are connected to a controller circuit, as described below with regards to FIG. 5.

In some examples, a wetting layer can be applied between the direct print traces and sensors and the conformal surface. The wetting layer improves adhesion, and can increase the conductivity of the traces by increasing the amount of material adhered. By way of example, the wetting layer can be a crystalline molybdenum compound such as Mo2C.

With continued reference to each of FIGS. 1-4, FIG. 5 schematically illustrates circuit 400 for connecting multiple sensors 402 to a controller 410, such as a microprocessor. The controller 410 facilitates validation monitoring and active monitoring during engine operations. Included within the circuit 400 is a current source 420 that provides a constant current to each sensor 402 via a first trace 422. The current source 420 is connected to a first node 404 of the sensor 402. A first input of a programmable gain amplifier 430 is also connected to the first node 404 via a second trace 424.

Figure 5:
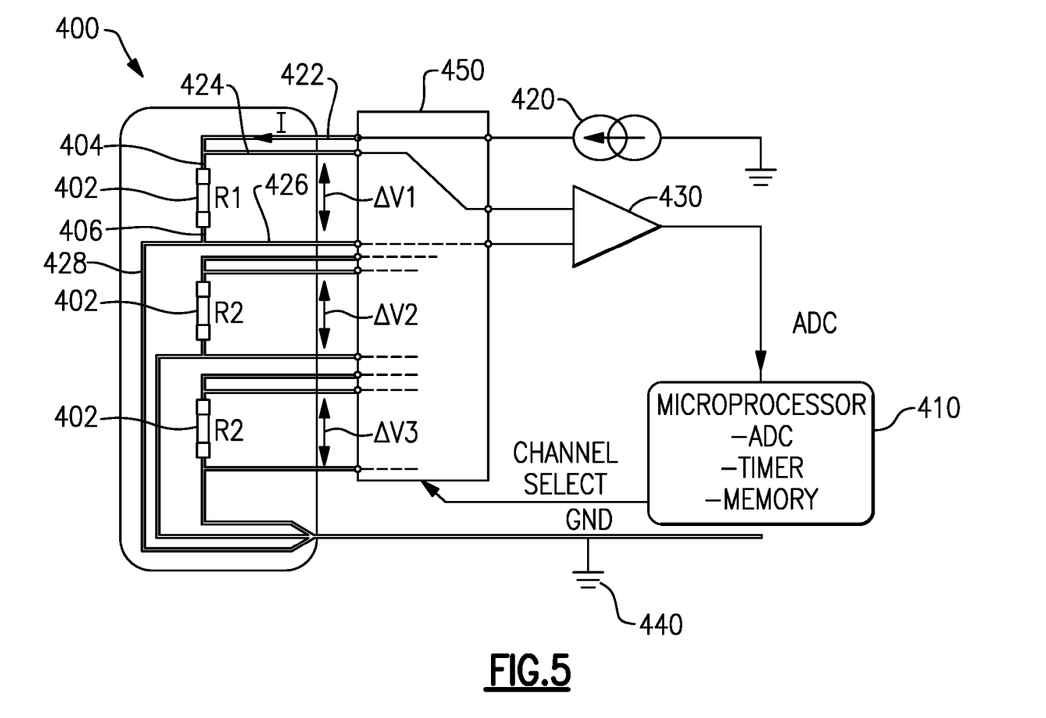
FIG. 5 schematically illustrates an exemplary thermal sensor circuit.

Connected to a second node 406, opposite the first node 404, of the sensor 402 is a second input of the programmable gain amplifier 430 via a third wire 426. A fourth trace 428 connects the second node of the sensor 402 to a neutral, or ground, connection 440. Using the two inputs, the programmable gain amplifier 430 determines a voltage drop across the sensor 402, and provides the determined voltage drop to the controller 410. As the controller 410 is aware of the constant current provided to the sensor 402, the controller is capable of determining the resistance of the sensor 402 at any given time via the known relationship V=I*R, where V is the voltage, I is the current, and R is the resistance of any given circuit.

In the illustrated example of FIG. 5, each of the four traces 422, 424, 426, 428 is connected to a single programmable gain amplifier 430, and the current source 420 via a multiplexer 450. In alternative examples, multiple programmable gain amplifiers and current source connections can be utilized, and the multiplexer 450 can be omitted.

The four wire connection provides a configuration where the measurement of any given sensor 402 depends neither on the line resistances, nor on the variations of the line resistances due to temperature. This benefit is at least partially achieved via constructing the traces of a material that has a negligible line resistance relative to the minimum expected resistance of the corresponding sensor 402. By way of example, the RTD sensors can be constructed of a platinum and ceramic material, and the printed circuit traces can be constructed of a copper material, resulting in line resistances that are negligible relative to the RTD sensor resistance at all expected operating temperatures of the engine. In alternative examples, alternative suitable metals or conductive materials can be utilized including nickel, tungsten, silver and the like.

While illustrated above in individual arrays of three RTD sensors, one of skill in the art will understand that the monitoring circuit of FIG. 5, as well as the distributed arrays of FIGS. 2-4 could include any number of RTD sensors connected via the four wire connection with minimal modification to the sensor array.

Figure 6A:
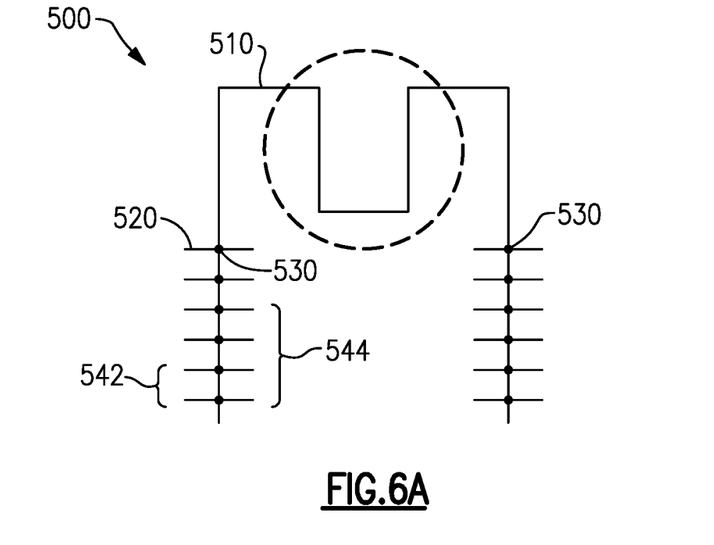
FIGS. 6A-6B illustrate an exemplary RTD printing process.
Figure 6B:
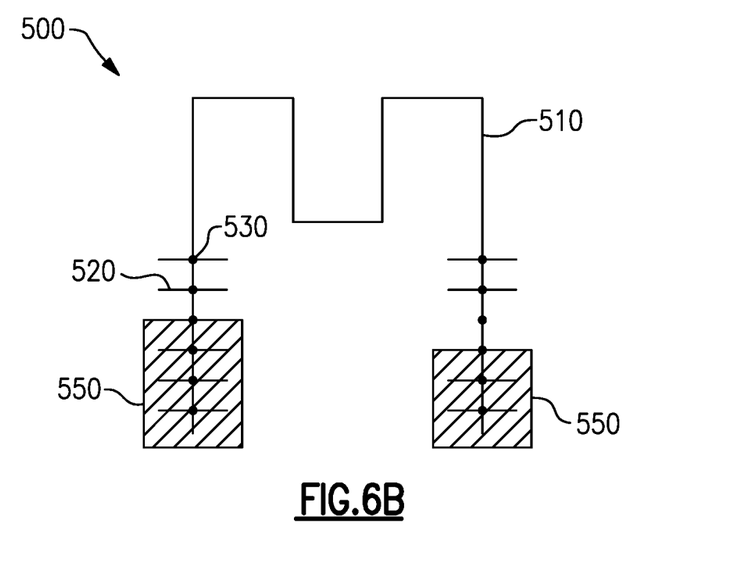

With continued reference to FIGS. 1-5, FIGS. 6A and 6B illustrate an exemplary printing procedure for direct printing a precise RTD sensor 500, with FIG. 6A representing an initial step, and FIG. 6B representing a final printed RTD sensor 500. Initially a trace 510 is printed using an RTD material. By way of example, the trace 510 can be a combination of platinum and ceramic materials that has a thermally dependent resistance.

Once the initial primary trace 510 is printed, a set of secondary traces 520 is printed normal to the trace 510, with each of the secondary traces 520 intersecting the primary trace 510 at a junction 530. Each of the secondary traces 520 on a given leg of the primary trace 510 are evenly spaced apart. In other words a gap 542 between two adjacent secondary traces 520 is ⅓ the length of a gap 544 between secondary traces having two intervening secondary traces. Depending on the specific implementation, each of the legs can have a different number of secondary traces and/or a different spacing between the secondary traces 520 from the other leg.

Once the initial traces have been printed, the specific resistance values from each junction 530 on one leg to each junction 530 on the other leg are measured and recorded. Based on this measurement, a node to node resistance that exactly matches the desired resistance of the RTD sensor 500 is determined. Once the desired node to node resistance is determined, a conductive layer 550 is applied over the portions of the circuit after each node 530 of the desired node to node configuration. The conductive layer shorts the excess traces, effectively removing them from the circuit. By doing so, the resistance of the RTD sensor 500 is set to the exact desired resistance. The conductive layer 550 can be any desired conductive material. In one example, the conductive layer is a silver material.

In the final configuration, illustrated in FIG. 6B, the conductive layer can serve a dual function of shorting out the excess traces of the RTD sensor 500 and acting as a terminal pad for connecting to the nodes of the four wire circuit discussed above.

One of skill in the art, having the benefit of this disclosure, will understand that the specifically enumerated sensed components are exemplary in nature, and the direct printed sensor configuration could be applied to any surface within a gas turbine engine where distributed temperature sensing is desired. Further, the array could be applied distributed across an entirety of the surface, or limited to only a portion of the surface, depending on the specific needs of the component being monitored.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
a conformal surface;
an array of resistance temperature detector (RTD) sensors disposed across at least a portion of the conformal surface;
a plurality of printed circuit traces deposited on said conformal surface and connecting each of said RTD sensors to a controller via a corresponding four wire circuit; and
wherein each circuit trace in said plurality of circuit traces extends to a circumferential edge of said conformal surface; and
wherein each of said RTD sensors is a printed precision RTD sensor comprising a primary trace and a plurality of secondary traces, a subset of the plurality of secondary traces being shorted by a conductive layer of the RTD sensor.

2. The component of claim 1, wherein the RTD sensors and the printed circuit traces are direct print components.

3. The component of claim 1, wherein each of the printed circuit traces is comprised of at least one of a copper, nickel, silver, platinum, and tungsten material.

4. The component of claim 3, wherein each of the RTD sensors is comprised of one of a pure platinum material and a printable ink formulation of platinum and an additive, wherein the additive is one of a ceramic additive and a polymeric additive.

5. The component of claim 1, wherein a line resistance of each of said circuit traces is negligible relative to a resistance value of a connected RTD sensor at a minimum operating temperature.

6. The component of claim 1, wherein a first node of each RTD sensor is connected to a current source and a first input of a corresponding programmable gain amplifier, and a second node of each RTD sensor is connected to a neutral and a second input of the corresponding programmable gain amplifier.

7. The component of claim 6, wherein each of the RTD sensors is connected to the same programmable gain amplifier via a multiplexer.

8. The component of claim 6, further comprising a plurality of programmable gain amplifiers, and wherein each of the RTD sensors is connected to a distinct programmable gain amplifier, the distinct programmable gain amplifier to which each of the RTD sensors is connected being the corresponding programmable gain amplifier for the RTD sensor.

9. The component of claim 1, further comprising a wetting layer disposed between said printed circuit traces and said conformal surface.

10. The component of claim 9, wherein the wetting layer comprises a crystalline molybdenum compound.

11. The component of claim 10, wherein the crystalline molybdenum compound comprises Mo2C.

12. The component of claim 1, wherein the conformal surface is a surface of a combustor panel.

13. The component of claim 1, wherein the primary trace is comprised of one of a platinum and a platinum and ceramic mixture, and wherein the secondary traces are comprised of the same material as the primary trace.

14. The component of claim 1, wherein the conductive layer is comprised of a silver material.

15. The component of claim 1, wherein said conductive layer is a terminal pad for one node of the corresponding four wire circuit.

16. A gas turbine engine comprising:
- a compressor;
- a combustor fluidly connected to the compressor;
- a turbine fluidly connected to the combustor; and
- at least one component including a thermal sensor array disposed about at least one conformal surface of the gas turbine engine, wherein the thermal sensor array is an approximately two dimensional array; and
- wherein the thermal sensor array is an array of resistance temperature detector (RTD) sensors disposed across at least a portion of the conformal surface;
- a plurality of printed circuit traces deposited on said conformal surface and connecting each of said RTD sensors to a controller via a corresponding four wire circuit; and
- wherein each circuit trace in said plurality of circuit traces extends to a circumferential edge of said conformal surface; and
- wherein each of said RTD sensors is a printed precision RTD sensor comprising a primary trace and a plurality of secondary traces, a subset of the plurality of secondary traces being shorted by a conductive layer of the RTD sensor.

17. The gas turbine engine of claim 16, wherein each thermal sensor in the thermal sensor array is a resistance temperature detector (RTD) sensor and wherein each of said RTD sensors is connected to a current source and a first input of a programmable gain amplifier, and a second node of each RTD sensor is connected to a neutral and a second input of the programmable gain amplifier.

18. The gas turbine engine of claim 16, wherein the at least one conformal surface includes a conformal surface of one of the compressor, the combustor, and the turbine.

* * * * *